US007685937B2

(12) United States Patent
Karioja et al.

(10) Patent No.: US 7,685,937 B2
(45) Date of Patent: Mar. 30, 2010

(54) COMPOSITE DOCTOR BLADE

(75) Inventors: Mikko Karioja, Jyväskylä (FI); Ari Närhi, Kuopio (FI); Harri Ruotsalainen, Varkaus (FI)

(73) Assignee: Metso Paper, Inc., Helsinki (FI)

( * ) Notice: Subject to any disclaimer, the term of this patent is extended or adjusted under 35 U.S.C. 154(b) by 780 days.

(21) Appl. No.: 11/303,747

(22) Filed: Dec. 15, 2005

(65) Prior Publication Data

US 2006/0130749 A1 Jun. 22, 2006

(30) Foreign Application Priority Data

Dec. 17, 2004 (FI) ................................ 20045488

(51) Int. Cl.
*B41F 9/10* (2006.01)
*B41F 31/00* (2006.01)
*B41F 1/29* (2006.01)
*D21G 3/04* (2006.01)
*B05C 1/06* (2006.01)
*B05C 1/08* (2006.01)
*A46B 15/00* (2006.01)
*B21B 45/02* (2006.01)
*B60S 1/28* (2006.01)

(52) U.S. Cl. .................... 101/157; 101/169; 101/350.6; 101/352.13; 162/281; 118/261; 15/256.5

(58) Field of Classification Search ................. 101/165, 101/167, 350.6, 350.1, 352.13, 154, 157, 101/155, 169; 162/281, 280; 15/245, 245.1, 15/250.06, 205.09, 250.38, 250.48, 250.452, 15/250.453, 256.1, 256.2, 256.3, 256.5; 118/261, 118/413
See application file for complete search history.

(56) References Cited

U.S. PATENT DOCUMENTS

| | | | | | |
|---|---|---|---|---|---|
| 3,817,208 | A * | 6/1974 | Barnscheidt et al. | ........ | 118/119 |
| 4,241,691 | A | 12/1980 | Hopfe et al. | | |
| 4,549,933 | A * | 10/1985 | Judd et al. | .................. | 162/281 |
| 5,047,263 | A * | 9/1991 | Glemet | ....................... | 427/203 |
| 5,237,375 | A * | 8/1993 | Michlin et al. | ............. | 399/274 |
| 6,749,725 | B1 * | 6/2004 | Isometsa et al. | ............. | 162/281 |
| 6,820,316 | B2 * | 11/2004 | Rata | ............................ | 29/415 |
| 2002/0189777 | A1 * | 12/2002 | Rata et al. | ................... | 162/281 |
| 2004/0217702 | A1 * | 11/2004 | Garner et al. | ............... | 313/512 |
| 2004/0237884 | A1 * | 12/2004 | Rata et al. | ................... | 118/123 |
| 2005/0087318 | A1 * | 4/2005 | Corriveau | ................... | 162/281 |
| 2005/0217818 | A1 * | 10/2005 | Breiten et al. | .............. | 162/280 |

* cited by examiner

*Primary Examiner*—Daniel J Colilla
*Assistant Examiner*—Leo T Hinze
(74) *Attorney, Agent, or Firm*—Stiennon & Stiennon

(57) ABSTRACT

A composite doctor blade to be installed in a blade holder (11) containing a throat (15) has a rear part (14) made of a composite material which has a profiling (16) which protrudes beyond the plane (18) defined by the doctor blade in order to retain the doctor blade in the blade holder (11). At a distance from the rear part (14), part (17) of the profiling (16) protrudes from the plane (18) to one side only. Moreover, the part (17) is higher than its width in the cross-sectional plane of the doctor blade.

14 Claims, 3 Drawing Sheets

16
18
22
17
19
20
10
α

COMPOSITE DOCTOR BLADE

CROSS REFERENCES TO RELATED APPLICATIONS

This application claims priority on Finnish Application No. 20045488, filed Dec. 17, 2004, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention concerns a composite doctor blade to be installed in a blade holder which contains a throat, and where the rear part of the doctor blade made of a composite material has a profiling which protrudes beyond the plane defined by the doctor blade in order to retain the doctor blade in the blade holder.

U.S. Pat. No. 4,241,691 describes a composite doctor blade fitted in a blade holder. The said doctor blades are used for instance in the doctors of paper machines. There is a profiling in the rear part of the doctor blade presented. Correspondingly, the blade holder has a throat which matches the doctor blade and its profiling. The profiling, which is thicker than the rest of the doctor blade, retains the doctor blade in the blade holder thus preventing the blade from falling out of the throat. The profiling also retains the doctor blade in the blade holder in the correct position and location.

The doctor blade described above is only suited for use in blade holders specifically designed for it. Hence, it cannot be applied universally. Moreover, the thick profiling makes the doctor blade unnecessarily rigid, which makes its use and handling more difficult.

SUMMARY OF THE INVENTION

An objective of the present invention is to accomplish a composite doctor blade which can be used more universally and which is more user friendly than before and which avoids the drawbacks of prior art solutions. In the doctor blade according to the invention, the profiling is designed and dimensioned in a new and surprising way. The doctor blade can hence be fitted easily to various types of blade holders. Moreover, the doctor blade is more durable than before. The doctor blade can also be made considerably more flexible than before so that especially the handling of the doctor blade is easier and safer than before. The other advantages of the doctor blade according to the present invention are described in more detail in conjunction with the application examples.

In the following, the invention is described in more detail with reference to the accompanying drawings describing some applications of the invention.

DESCRIPTION OF THE PREFERRED EMBODIMENTS

Figure 1:
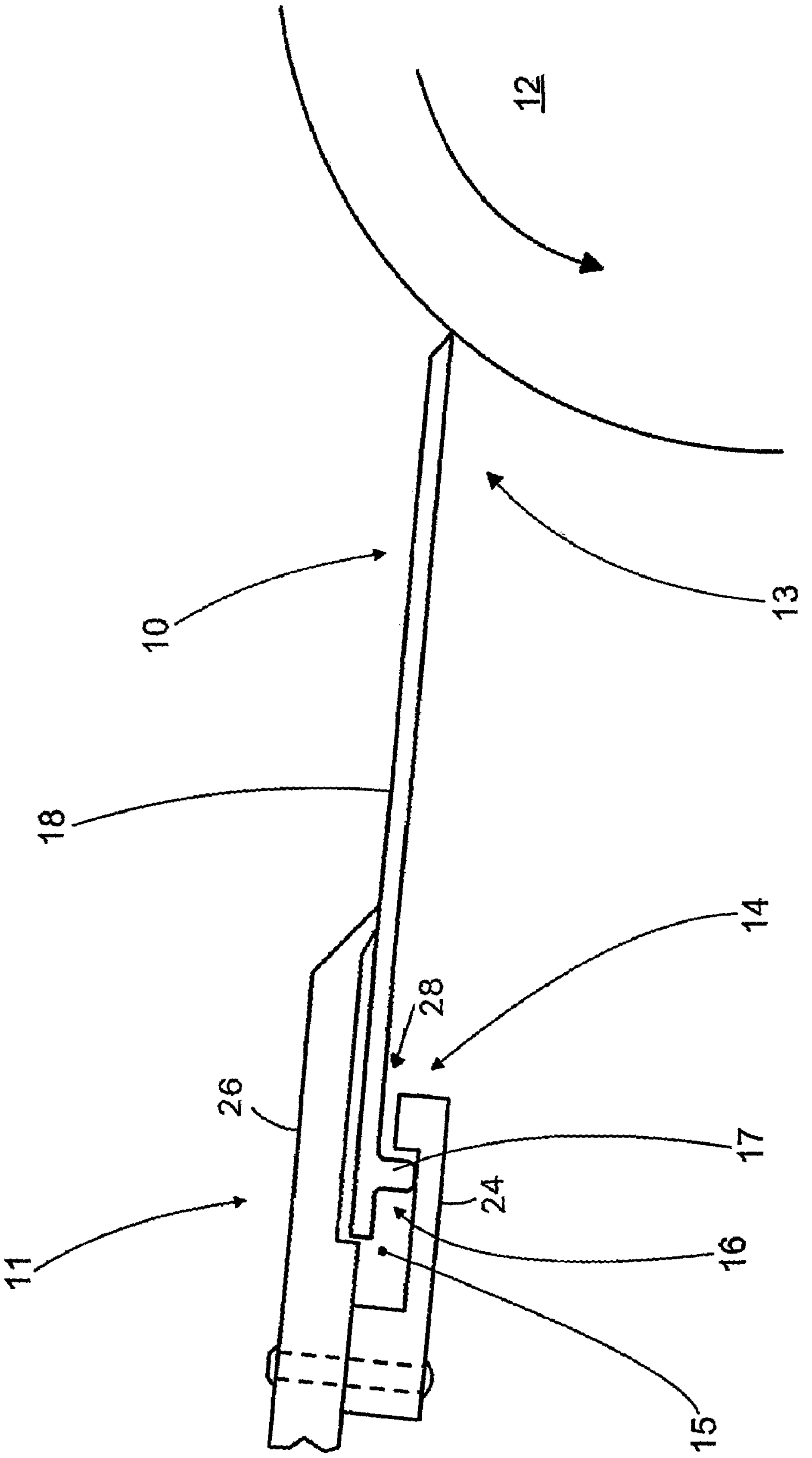
FIG. 1 is a doctor blade according to the invention fitted in a blade holder.

FIG. 1 shows the doctor blade 10 according to the invention installed in a blade holder 11 of the doctor. Alongside a doctor, the doctor blade according to the invention can be used, for instance, in coating equipment or in other similar devices. In FIG. 1, the surface of the roll 12 is doctored by the front part 13 of the doctor blade 10. Moreover, the doctor blade 10 is installed in the blade holder 11 which is part of the doctor and which is presented only in part in FIG. 1. The blade holder 11 has a first part 24 spaced from a second part 26 to define a throat 15 therebetween. The blade holder 11 has an opening 28 at a first end through which the doctor blade 10 projects.

The rear part 14 of the doctor blade 10 made of a composite material has a protrusion or profiling 16 which protrudes from the plane 18 defined by the doctor blade in order to retain the doctor blade 10 in the blade holder 11. In accordance with FIG. 1, the profiling 16 stays in the throat 15 of the blade holder 11 thus preventing the doctor blade 10 from falling out. According to the invention, part 17 of the profiling 16 protrudes from the plane 18 at one side only at a distance from the rear part 14. Moreover, the part 17 is higher than its width in the cross-sectional plane of the doctor blade. The doctor blade 10 can hence be used in ordinary blade holders. The profiling part 17 extends to engage the blade holder first part 24 and the blade holder second part 26 engages the doctor blade 10 at a position spaced from the profiling towards the doctor blade front part 13. In practice, the profiling extends essentially over the entire length of the doctor blade and is of the same piece and material as the rest of the doctor blade. The doctor blade is hence of one piece without any falling or detaching parts. Moreover, a doctor blade made exclusively of a composite material does not scratch the blade holder.

According to the invention, the said part 17 is higher than its width. Moreover, the height of the part 17 from the plane 18 is 1.5-3, preferably 1.6-2.4 times the thickness of the doctor blade. This gives a sufficient retention effect at a preferably low consumption of raw material. Furthermore, the distance of the part 17 from the rear part 14 of the doctor blade 11 is less than three times the thickness of the doctor blade 11. The said dimensioning ensures the suitability of the doctor blade to as many types of blade holders as possible.

Figures 2A, 2B, 2C, 2D, 2E:
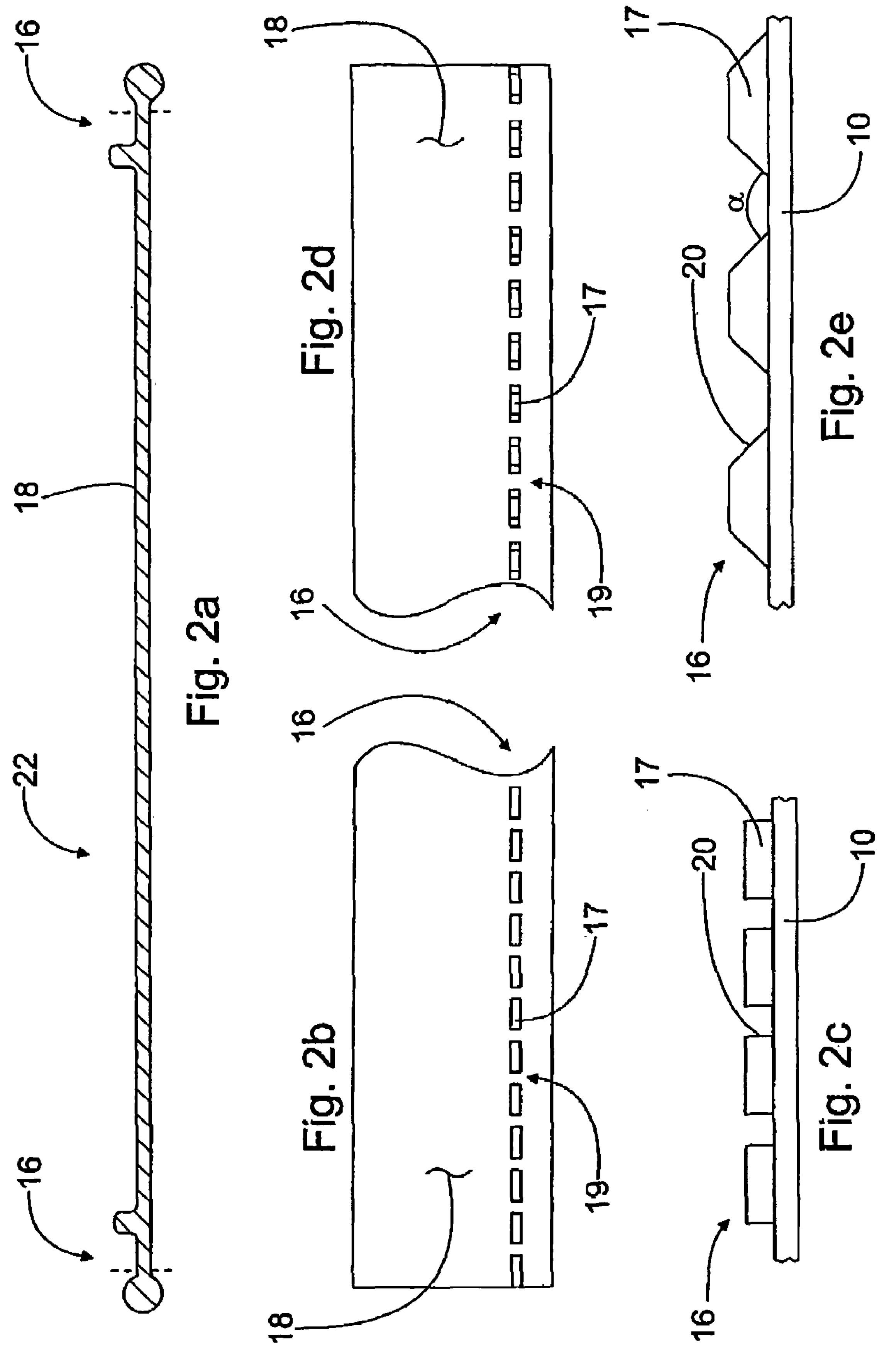
FIG. 2*a* is a doctor blade according to the invention during the manufacturing stage.
FIG. 2*b* is a part of the first application of the doctor blade according to the invention seen from the top.
FIG. 2*c* is a partial magnification of FIG. 2*b* seen from the rear.
FIG. 2*d* is a part of another application of the doctor blade according to the invention seen from the top.
FIG. 2*e* is a partial magnification of FIG. 2*d* seen from the rear.
Figure 3A:
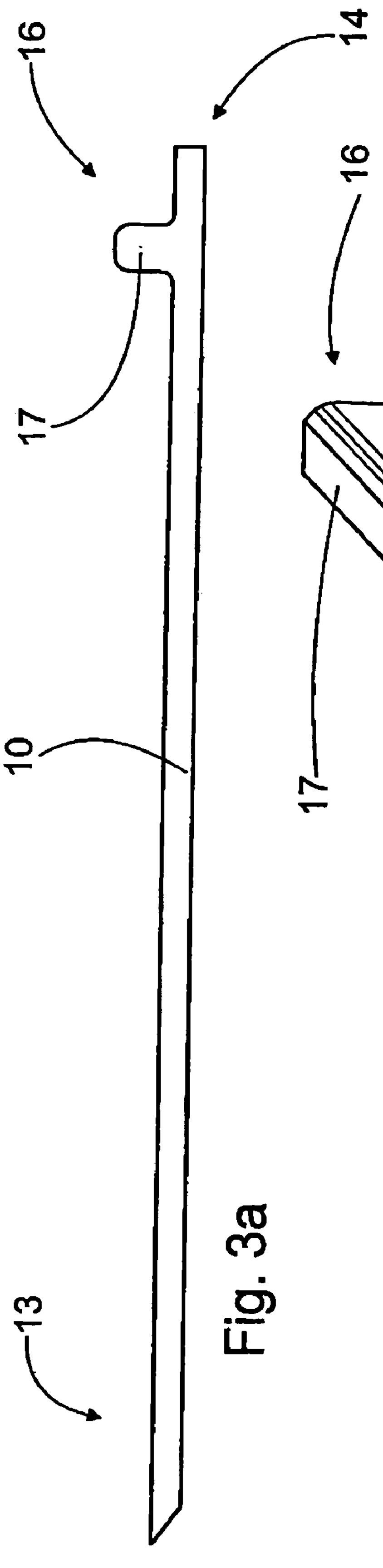
FIG. 3*a* is a ready-for-use doctor blade according to the invention.
Figure 3B:
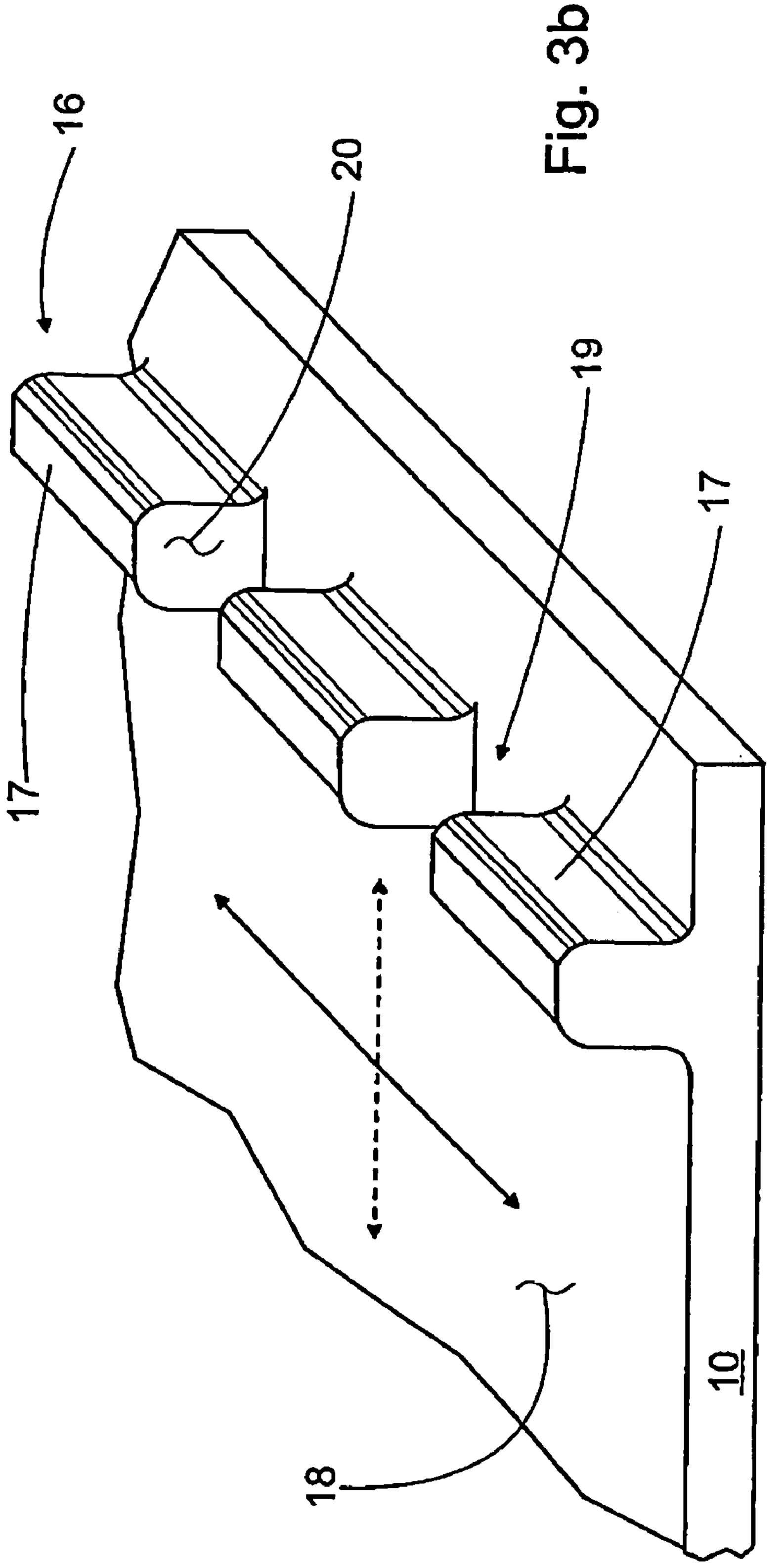
FIG. 3*b* is a partial magnification of the doctor blade according to the invention in an axonometric view.

FIG. 2*a* shows a doctor blade according to the invention during the manufacturing stage. A unified blank 22 is first formed preferably from a composite material. Composite material comprises reinforcement, for example glass or carbon fibers, and a matrix of plastic material, for example epoxy, polyester, vinylesterurethane, polyamide, or polyamideimide. For instance, the application in FIG. 2*a* shows a single blank with two doctor blades which have profilings 16. Finally, the doctor blades are detached from the formed blank 22. The doctor blades detached are ready for use without machining and contain the retention members. The blank 22 described is preferably formed by pultrusion. This method gives excellent shape and dimensional precision, eliminating the need to separately finish the doctor blade. The desired profiling is created by adjusting the settings of the pultrusion device and by using a suitable nozzle shape. Pultrusion also allows the orientation of the reinforcement fibers contained in the composite material. For instance, the reinforcement fibers can be arranged essentially in the lateral direction of the doctor blade. This makes the doctor blade rigid laterally but essentially flexible longitudinally. Thus the loading of the doctor, for example, is transmitted as well as possible to the doctor blade. On the other hand, a doctor blade which is flexible longitudinally adapts well to the shapes of the surface being doctored. FIG. 3*b* indicates the longitudinal direction of the doctor blade with a solid arrow and the lateral direction with a broken arrow.

As stated above, pultrusion gives a blank with excellent shape and dimensional precision, so that in principle the doctor blades will be ready for use after being detached. It is also easy to install a doctor blade with excellent shape and dimension precision to the blade holder. The spherical part in the profiling is mostly of excess raw material and it is also removed during detaching. In practice, this part contains more matrix material than reinforcement fibers. Its composition is hence different from the rest of the doctor blade or from the protruding part which is essentially homogeneous with the doctor blade. The part according to the invention is thus durable and it acts in the same manner as the doctor blade. Doctor blade detachment can be easily integrated in the pultrusion device so that an endless doctor blade can be manufactured easily and quickly. A doctor blade 10 according to the invention is presented as a side view in FIG. 3*a*. A similar doctor blade 10 installed in a blade holder 11 is presented in FIG. 1. If the blade holder allows, the spherical part can be left as part of the doctor blade.

In FIG. 2*a*, the thickness of the doctor blade is 1.8 mm and its width is 90 mm. The points of removal of the spherical parts are indicated by the broken lines in FIG. 2*a* The parts which protrude from the plane at the said points are at a distance of 6.7 mm from the rear part where a shear surface is thus formed. The said dimension is from the shear surface to the center of the protruding part. The height of the left-hand side part from the plane is approx. 3 mm, and the height of the right-hand side part from the plane is approx. 4 mm.

The doctor blade according to the invention has a homogeneous structure. In this way, the doctor blade, for instance, acts in a similar manner over its entire length when being loaded. In operation, the part according to the invention has a minor impact on the behavior of the doctor blade. On the other hand, when an unmounted doctor blade is handled, the part 17 that is higher than the thickness of the doctor blade stiffens the doctor blade. In other words, when the doctor blade is being wound, a large radius must be used. The doctor blade also behaves like a spring. According to the invention, the part 17 preferably has grooves 19 which cut the part 17 at regular intervals, with the grooves 19 situated in the lateral direction of the doctor blade. The said grooves 19 improve the flexibility of the doctor blade essentially while the retention capacity is still sufficient. This also reduces the total weight of the doctor blade. The doctor blade 10 can also be wound using a smaller radius whereby the handling of the doctor blade becomes safer. Moreover, flexibility is an advantage in conjunction with an automatic blade changing device.

The formation of the groove 19 can be integrated with the manufacturing process of the doctor blade, or the grooves can be machined afterwards. Even a small groove will increase flexibility easily. According to the invention, however, the groove 19 extends essentially up to the plane 18. Hence, the flexibility of the doctor blade 10 almost corresponds to a fully smooth doctor blade. The ratio of the width of the groove to the size of the part also has an impact on flexibility. The flexibility of the doctor blade can be increased by widening and deepening the groove. According to the invention, the width of the groove 19 is 0.8-1.2 times the width of the part 17 in the cross-sectional plane of the doctor blade.

In practice, straight grooves can be machined easily. Hence, according to the invention, the walls 20 of part 17 which restrict the groove 19 are essentially parallel. The winding of the doctor blade can be further facilitated by using oblique walls. Hence, according to the invention, as shown in FIG. 2*e*, the angle $\alpha$ defined by the walls 20 is less than 90°. The angles created in the doctor blade are hence obtuse, which facilitates the moving of the doctor blade in the throat and reduces the likelihood of parts failing off the doctor blade. In FIGS. 2*b* and 2*c*, the grooves are straight, and correspondingly, in FIGS. 2*d* and 2*e*, the grooves have oblique walls. Moreover, the grooves extend up to the plane in the applications presented.

The doctor blade according to the invention can be manufactured quickly and installed easily. The doctor blade can also be handled and packed more easily and safely than before. When using a doctor blade according to the invention, the blade holder is not scratched. When scratching is reduced, the fouling of the blade holder is also reduced and it will be easier to keep the blade holder clean.

The invention claimed is:

1. A composite doctor blade for retention within a blade holder having a first part which engages one surface of the doctor blade and a second part which engages an opposite surface of the doctor blade, a throat being defined between the blade holder first part and the blade holder second part, the doctor blade comprising;

a doctor blade structure made of a homogeneous composite material, the doctor blade structure defining a doctor blade length in a longitudinal direction, a doctor blade width in a lateral direction, and a doctor blade thickness, and a first plane in which the doctor blade length and doctor blade width lie, the first plane being coextensive with a first side surface of the doctor blade structure, and the doctor blade structure defining a cross-sectional plane perpendicular to the first plane and to the doctor blade length, and containing the doctor blade thickness, and the doctor blade width;

the doctor blade structure having a front part for doctoring a surface of a roll, and a rear part for retention in a doctor blade holder, the rear part forming a rear end:

wherein the rear part of the doctor blade structure has portions forming a profiling which protrudes beyond the first side surface to be arranged to engage the blade holder first part within a throat so as to retain the doctor blade structure in a doctor blade holder, wherein the profiling protrudes beyond only the first side surface of the doctor blade structure so that a side opposite the profiling is without a protruding profiling and the profiling is spaced from the rear end, the doctor blade rear part being configured so as to not engage a blade holder second part at a position opposite the profiling, and wherein the profiling has a width measured in the cross-sectional plane of the doctor blade structure and a height measured in the cross-sectional plane of the doctor blade structure from the first side surface of the blade structure, and wherein the profiling protrudes higher from the first side surface than the width of the profiling in the cross-sectional plane; and wherein the height of the profiling protrudes beyond the first side surface of the doctor blade structure rear part 1.5-3 times the doctor blade thickness; and wherein the profiling has grooves which cut the profiling at regular intervals, with the grooves extending in the lateral direction of the doctor blade structure and extend essentially to the first side surface.

2. The doctor blade of claim 1, wherein the height of the profiling protrudes beyond the first side surface 1.6-2.4 times the doctor blade thickness.

3. The doctor blade of claim 1, wherein the distance of the profiling from the rear end is less than three times the doctor blade thickness.

4. The doctor blade of claim 1, wherein the grooves have a width in the longitudinal direction of 0.8-1.2 times the width of the profiling in the cross-sectional plane of the doctor blade structure.

5. The doctor blade of claim 1, wherein each groove is defined by two spaced walls formed in the profiling, and wherein the two walls of each groove are essentially parallel.

6. The doctor blade of claim 1, wherein each groove is defined by two spaced walls formed in the profiling, and wherein the two walls of each groove define an angle therebetween which is less than 90°.

7. A composite doctor blade installed in a blade holder, comprising;

a blade holder having a first part spaced from a second part to define a throat therebetween, and an opening at a first end; and a composite doctor blade of a first thickness which extends within the blade holder throat and which has a front part which projects from the blade holder through the first end opening, and a rear part terminating at a rear end, the rear part of the doctor blade having a profiling which protrudes beyond a plane defined by a first side surface of the doctor blade in order to retain the doctor blade in the blade holder, wherein the profiling protrudes from the first side surface only, so that a side opposite the profiling is without a protruding profiling and such that the profiling protrudes at a distance from the rear end, with the profiling being higher than its width in a cross-sectional plane defined from the front part to the rear part of the doctor blade, the profiling extending to engage the blade holder first part, wherein the blade holder second part engages the doctor blade at a position spaced from the profiling towards the doctor blade front part; and wherein the profiling protrudes beyond the first side surface of the doctor blade 1.5-3 times the first thickness of the doctor blade; and wherein the profiling has grooves which cut the profiling at regular intervals, with the grooves extending in the lateral direction of the doctor blade and extend essentially to the first side surface.

8. The apparatus of claim 7, wherein the height of the profiling from the first side surface is 1.6-2.4 times the first thickness of the doctor blade.

9. The apparatus of claim 7, wherein the profiling is spaced from the rear end a distance which is less than three times the first thickness.

10. The apparatus of claim 7, wherein the grooves have a width in a longitudinal direction of 0.8-1.2 times the width of the profiling.

11. The apparatus of claim 7, wherein each groove is defined by two spaced walls formed in the profiling, and wherein the two walls of each groove are essentially parallel.

12. The apparatus of claim 7, wherein each groove is defined by two spaced walls formed in the profiling, and wherein the two walls of each groove define an angle therebetween which is less than 90°.

13. A composite doctor blade formed of reinforcement fibers with a matrix of plastic material, the doctor blade for installation within a blade holder having a throat; the doctor blade comprising:

a blade portion extending in a first plane forming a doctor blade structure of a first thickness, the blade portion having a front part for engagement against an element to be doctored, and a rear part, a first direction being defined extending between the front part and the rear part; and a protrusion which extends from the blade between the front part and the rear part out of the first plane and above the doctor blade structure, the protrusion for engagement within the throat of the blade holder, wherein the protrusion extends only on a first side of the first plane, so that a side opposite the protrusion is without a protrusion and wherein a second direction is defined perpendicular to the first plane, and wherein the protrusion extends a height 1.5 to 3.0 times the blade thickness in the second direction away from the first plane; and wherein the protrusion has a width in the first direction, and wherein the protrusion height is greater than the protrusion width, and wherein the protrusion has grooves which reach to the first side and which extend in the first direction.

14. The doctor blade of claim 13, wherein each groove is defined by two spaced walls formed in the protrusion, and wherein the two walls of each groove define an angle therebetween which is less than 90°.

* * * * *